United States Patent [19]

Dunn

[11] 4,026,330
[45] May 31, 1977

[54] DEVICE FOR FEEDING GAS INTO UNDERGROUND CAVITIES TO ASPHYXIATE RODENTS

[76] Inventor: Kenneth Michael Dunn, 2025 Alice St., Santa Cruz, Calif. 95062

[22] Filed: Feb. 3, 1976

[21] Appl. No.: 654,766

[52] U.S. Cl. .................................. 138/103; 43/124
[51] Int. Cl.² .......................................... F16L 55/00
[58] Field of Search .................... 43/124, 125, 126; 138/103

[56] References Cited

UNITED STATES PATENTS

| 209,859 | 11/1878 | Callahan | 138/103 |
| 2,413,143 | 12/1946 | Jucksch | 43/124 |
| 2,467,922 | 4/1949 | Woytal et al. | 43/125 |

*Primary Examiner*—Robert I. Smith
*Attorney, Agent, or Firm*—Gerald L. Moore

[57] ABSTRACT

A device for attachment to a gas-generating apparatus such as a gasoline-powered lawnmower to receive and transmit the exhaust gas from the apparatus to an opening in an underground cavity to asphyxiate rodents inhabiting the cavity.

1 Claim, 2 Drawing Figures

DEVICE FOR FEEDING GAS INTO UNDERGROUND CAVITIES TO ASPHYXIATE RODENTS

BACKGROUND OF THE INVENTION

Certain rodents such as gophers live in underground cavities and frequently like to inhabit garden and lawn areas where they are not wanted. Various methods of eradicating these animals have been devised usually comprising spring-trap type devices or poisons. Obviously both of these methods can be dangerous to children or other animals. In addition, such methods are frequently not very effective.

The subject invention involves a device for transmitting exhaust gas from an apparatus such as a lawnmower into the underground lair of the rodent. While asphyxiating gases have been used in the past, the invention presents the advantages of an inexpensive yet very effective means for utilizing the exhaust gases from lawnmowers and the like to eradicate the rodents.

SUMMARY OF THE INVENTION

A device for transmitting asphyxiating gas from a source such as a lawnmower into the underground lair of a rodent including an elongated pipe with means for attaching one end to the exhaust of the apparatus with the other extending end being adapted for insertion into an opening to the lair. The device includes a shield or skirt spaced from the extending end and configured to seal the lair opening around the pipe to prevent the gases from escaping from the lair. In addition an insulated handle is provided to ease the handling, insertion and withdrawal of the device into the lair.

DESCRIPTION OF THE INVENTION

Figure 1:
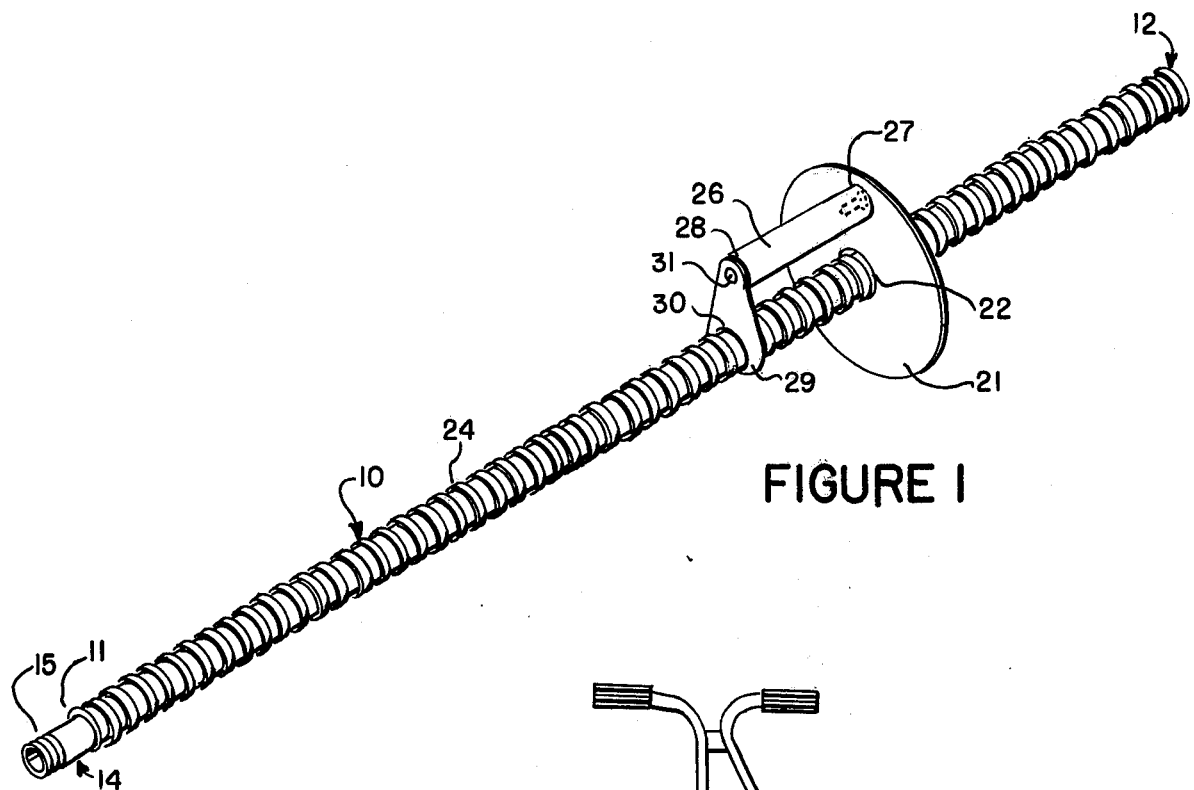
FIG. 1 is a perspective view of the invention.

The invention is illustrated in FIG. 1 and generally comprises an elongated tubular pipe or conduit 10 having a first end 11 and a second end 12. In the usual instance, this tube has an outer diameter of approximately 1 inch forming an elongated conduit having an inside diameter of approximately three-fourths of an inch. Preferably the conduit is sufficiently flexible to permit bending so that the second end thereof can be extended at an angle to the first end. One commercially available product on the market which has been utilized to form this conduit is the product known as electrical conduit through which electrical wires are passed and which serves as a shield to protect those wires. Preferably the conduit is made of metal or at least a material which will withstand combustion or deterioration under exposure to hot gases.

Figure 2:
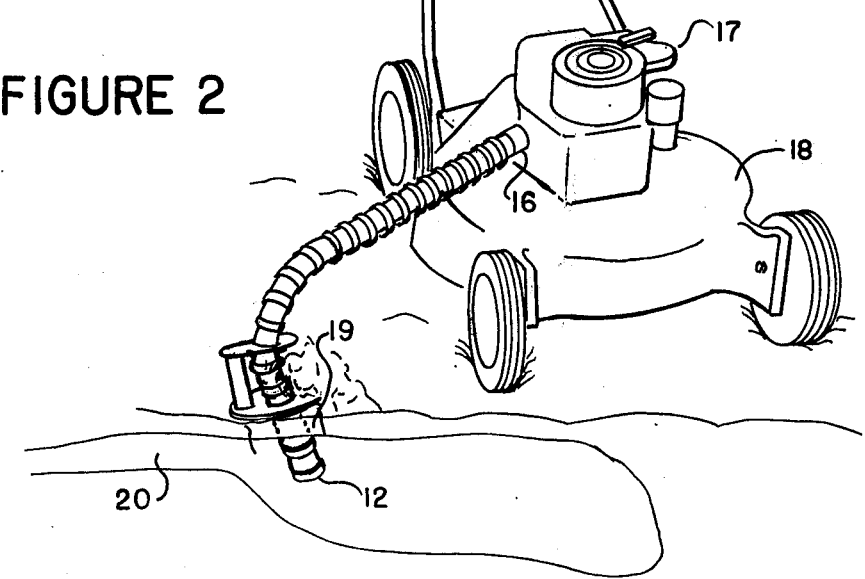
FIG. 2 is a perspective view of the device fastened to the exhaust system of a lawnmower and inserted into a rodent lair.

As illustrated in FIG. 2 there is fixed to the first end of the conduit a pipe 14 having a threaded end 15 which can be screwed into the exhaust port in the block after removal of the muffler unit of a standard lawnmower 17. The conduit preferably is approximately 36 inches long so as to reach horizontally past the housing 18 of the lawnmower to thereafter extend downward so that the second or extending end 12 can be inserted into an access entrance 19 to reach at least partially into an underground cavity 20 commonly occupied by such rodents as gophers. With the device so inserted into the lair, the lawnmower can be started so as to pump exhaust gas comprising mainly carbon monoxide through the conduit 10 and into the lair. Such gases are extremely effective in killing rodents in a painless manner.

Serving as means for sealing the opening 19 through which the extending end 12 is inserted is a shield or skirt 21 which in the preferred embodiment is planar and approximately 6 inches in diameter. This skirt is formed of a single piece of sheet metal approximately one-sixteenth to one-eighth of an inch thick. If electrical conduit is used for the tubular member 10, the skirt can be fixed thereon by cutting a center opeing 22 therethrough having a diameter equal to the smaller outer diameter of the conduit between the seams 24 of the tube. Thereafter the skirt can be threaded onto the conduit to a predetermined point approximately one-third the length of the conduit from the end 12 of the conduit. This skirt is sufficiently large to seal the lair opening when the end 12 is inserted through the entrance to the lair and assist in preventing the escape of gases from the lair. To further seal the opening, the skirt serves as a foundation for dirt to be packed around the tube for sealing. With the device in this position the lawnmower pumps the combustion gases under pressure throughout the lair and asphyxiates the rodents.

For handling the tube, there is provided a heat-insulating handle 26 which preferably is made of wood or other material which is a poor heat conductor. The handle is approximately 5 inches long with one end 27 being fixed to the skirt 21 preferably by a screw (not shown) which passes through the skirt and is threaded into the handle end in the axial direction. The other end 28 of the handle is fixed to a support 29 adjacent to but spaced from the shield towards the conduit first end. This support like the skirt includes a center opening 30 sized to be threaded over the conduit 10. A screw 31 extends through an opening in the support and is threaded into the handle in a longitudinal direction. Thus the handle is fixed rigidly to the tube.

By grasping the handle 26, the extending end 12 can be inserted easily into the rodent lair. With the end 11 screwed onto the exhaust port of the lawnmower, the gases are pumped through the tube and into the lair. However the tube will become heated to a sufficient temperature harmful to one touching the outer surface. By grasping the heat insulating handle 26, the tube can be lifted and maneuvered without burning the user as the lawnmower is moved from opening to opening for thoroughly filling the lairs with gas.

Thus it can be seen that there is provided a device permitting the use of the exhaust gases from lawnmower or other device and which can be easily manipulated and handled for insertion into rodent lairs for asphyxiating rodents. When inserted into the lair, sealed with dirt placed on the planar shield, and the lawnmower is idled for 15 minutes, rodents in the lair will be asphyxiated.

The invention claimed is:
1. A device for transmitting asphyxiating gas from a source through an opening and into an underground cavity for asphyxiating rodents, comprising in combination
an elongated flexible conduit having first and second ends and a central opening therethrough for the transmittal of gases from the first end of the conduit to the second;

means fixed to a first end of the conduit for attachment to the source of asphyxiating gas;

a planar shield fixed to the outer surface of the conduit a predetermined distance from the conduit second end and extending normal to the conduit longitudinal axis a sufficient distance to cover the opening into the underground cavity when the second end is inserted through the opening and into the cavity, and an elongated heat insulating handle having one end fixed to said planar shield and the other end fixed to said conduit at a position between the shield and the conduit first end for mounting the handle in parallel spaced relationship to the conduit to enable handling the conduit whereby by attachment of the first conduit end to a gas source and placement of the second conduit end into an opening in an underground cavity, the rodents therein can be asphyxiated.

* * * * *